Figure 1:
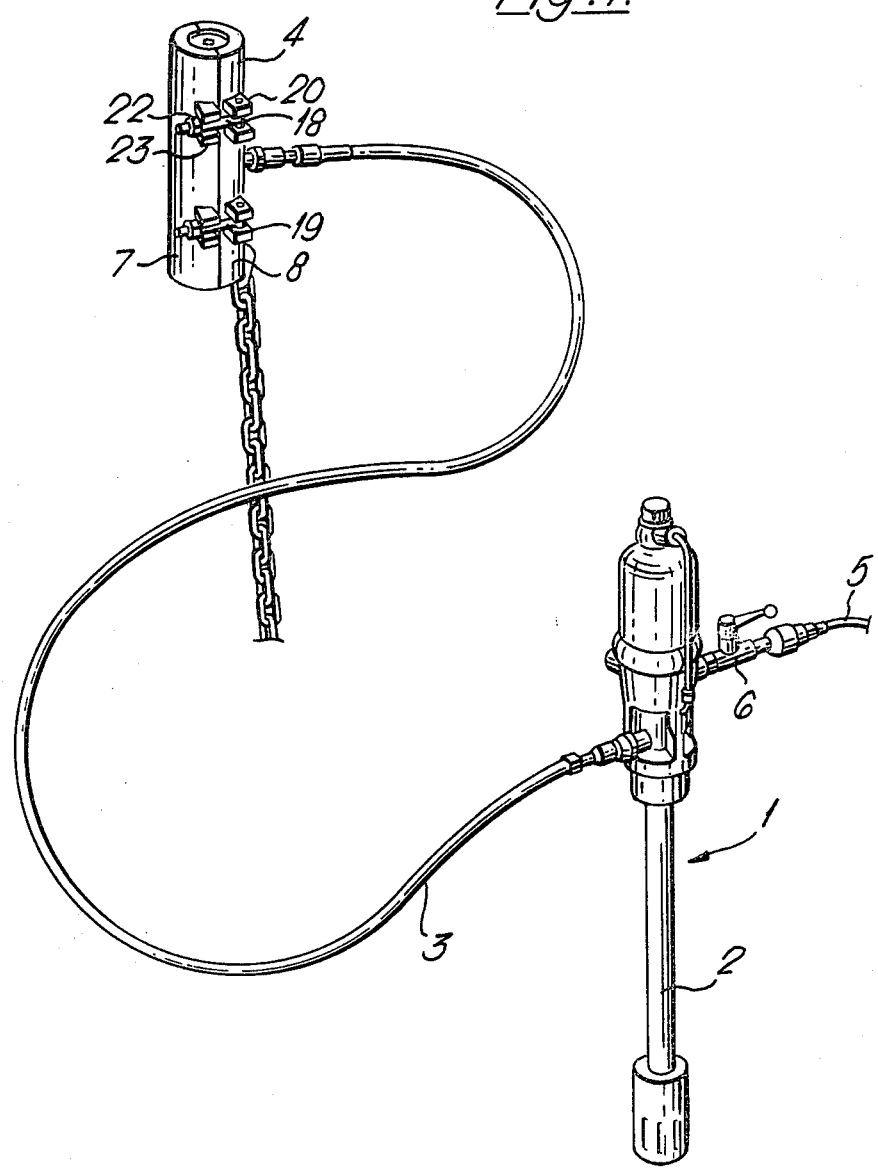

United States Patent [19]

Johansen

[11] 4,422,529
[45] Dec. 27, 1983

[54] METHOD AND APPARATUS FOR LUBRICATING STEEL CABLE

[75] Inventor: Steinar Johansen, Eiken, Norway

[73] Assignee: Masto Wireservice A/S, Kristiansand S, Norway

[21] Appl. No.: 248,297

[22] Filed: Mar. 27, 1981

[30] Foreign Application Priority Data

Oct. 6, 1980 [NO] Norway ................. 802958

[51] Int. Cl.³ .............................. F16N 7/00
[52] U.S. Cl. .................. 184/15 R; 184/1 E
[58] Field of Search .............. 184/15 R, 15 A

[56] References Cited

U.S. PATENT DOCUMENTS

| | | | |
|---|---|---|---|
| 1,049,170 | 12/1912 | Thomas | 184/15 R |
| 2,435,120 | 1/1948 | Baker | 184/15 R |
| 3,951,235 | 4/1976 | Acerbi | 184/15 R |
| 4,046,225 | 9/1977 | Shenk | 184/15 R |
| 4,326,605 | 4/1982 | Conti | 184/15 R |

FOREIGN PATENT DOCUMENTS 583501 12/1977 U.S.S.R. ............. 184/15 R
605778 5/1978 U.S.S.R. ............. 184/15 R

*Primary Examiner*—David H. Brown
*Attorney, Agent, or Firm*—Pasquale A. Razzano

[57] ABSTRACT

A method of lubricating steel cable wherein the steel cable is drawn through a chamber containing lubricant under pressure. The chamber has an outlet and an inlet lined with rubber sleeves through which the cable passes. A liquid lubricant is utilized, preferably a lubricating oil, which is supplied to the chamber by means of a pump having a high delivery pressure, minimum 20 bar and preferably above 40 bar, but with a relatively small delivery capacity. The rate of passage for the steel cable through the chamber is adapted such that the hollow spaces in the steel cable absorb the supplied oil to such an extent that oil leakage is avoided. The apparatus for carrying out the method comprises a chamber for lubricant under pressure, having an inlet and an outlet for the steel cable. A supply hose for lubricant leads to the chamber, and a pressure pump ensures pressure in the lubricant. The pump is a suction pump which can deliver a pressure of at least 20 bar, preferably above 40 bar, but has a small delivery capacity.

3 Claims, 3 Drawing Figures

METHOD AND APPARATUS FOR LUBRICATING STEEL CABLE

The present invention relates to a method for lubricating steel cable, wherein the steel cable is drawn through a sleeve-shaped gasket into a chamber containing lubricant under pressure and withdrawn from the chamber through a second sleeve-shaped gasket. The invention also relates to an apparatus for implementing the method.

Means for lubricating steel cable or wire are known previously. German Pat. No. 25 49 487 discloses a lubricating device which in one embodiment has a sleeve-shaped chamber having an opening with a sleeve-shaped gasket through which the cable is inserted at one end of the chamber and an outlet opening for the cable, also with a sleeve-shaped gasket, at the other end thereof, lubricant under pressure being supplied to the chamber through a hose. The construction of this known apparatus is based on the prior art techniques of lubricating cable, i.e., coating the outside circumference of the cable with lubricant applied with a brush or the like. In the known apparatus, lubricant, preferably grease, is supplied to the chamber at a pressure which is sufficiently high to keep the chamber filled with grease at all times such that the cable is continuously coated with grease on the outside.

Experience has shown, however, that these known devices have considerable drawbacks. Firstly, it is not sufficient under many conditions that the wire is coated with grease on the outside. In especially corrosive environments, such as on ships, oil platforms and the like, sea water can penetrate beyond the protective outer layer of grease and corrode the steel cable on the inside. A second disadvantage of the known lubricating means is that the grease forces its way past the gaskets and soils the surrounding area, despite the fact that a very moderate pressure is maintained in the lubricating chamber. This is a distinct drawback, as it necessitates a costly clean-up operation following the lubricating job on the steel cable, as regulations on board ships are very strict in regard to grease and oil on deck.

The object of the present invention is to eliminate the above drawbacks, providing a method and an apparatus whereby one can obtain effective lubrication of steel cables, without spillage and at a high rate of speed.

This is obtained according to the invention by a method as defined above, which is characterized in that a liquid lubricant is used, preferably a lubricating oil, that the lubricant is supplied to the chamber by means of a pump having a high delivery pressure, minimum 20 bar and preferably above 40 bar, but having a relatively small capacity, and that the rate at which the steel cable is drawn through the lubricant is adapted such that the hollow spaces in the cable absorb the oil to such a degree that oil leakage through the gaskets is avoided. Taking as a point of departure the known apparatus discussed above, one would think that spillage could be prevented by using the thickest possible grease and reducing the pressure. However, it has surprisingly been found that the opposite is the case. If one utilizes a liquid lubricant and a high pressure, the lubricant will immediately be forced into all the hollow spaces in a steel cable. One can look upon the steel cable as a pipe having a large number of evenly spaced perforations, such that as soon as the pipe is introduced into the chamber, the oil under pressure will be injected into all the perforations and fill the pipe. By adapting the rate or passage of the cable relative to the pressure and capacity of the pump, leakage will be reduced to a minimum. This balance between the rate of passage for the cable through the chamber and the pressure and capacity of the pump is not critical, either. One must remember that the pressure in the chamber is reduced to just the amount of pressure necessary to force lubricant into all the hollow spaces in a cable, and that the inlet and outlet of the chamber are sealed by the cable passing therethrough. A steel cable, as everyone known consists of a mass of intertwined steel wires which collectively have a very large surface. The oil will thus not spurt out between the moving cable and the surrounding gasket, as occurs with grease, but will seep into the cable and disperse itself on the surface of the large number of steel wires. Even if the cable is saturated with oil in all the hollow spaces, the dripping from the cable as it passes out of the chamber will still be very small.

An apparatus for carrying out the method comprises a chamber intended to hold a lubricant under pressure, having an inlet and an outlet, each with tight-fittng sleeve-shaped gaskets, for the steel cable, a supply hose for the lubricant which is connected to the chamber, and a pressure pump for providing pressure in the lubricant, and the characteristic feature of the apparatus is that the pump is a suction pump which can deliver a pressure of at least 20 bar, preferably above 40 bar, and has a small delivery capacity.

Figure 2:
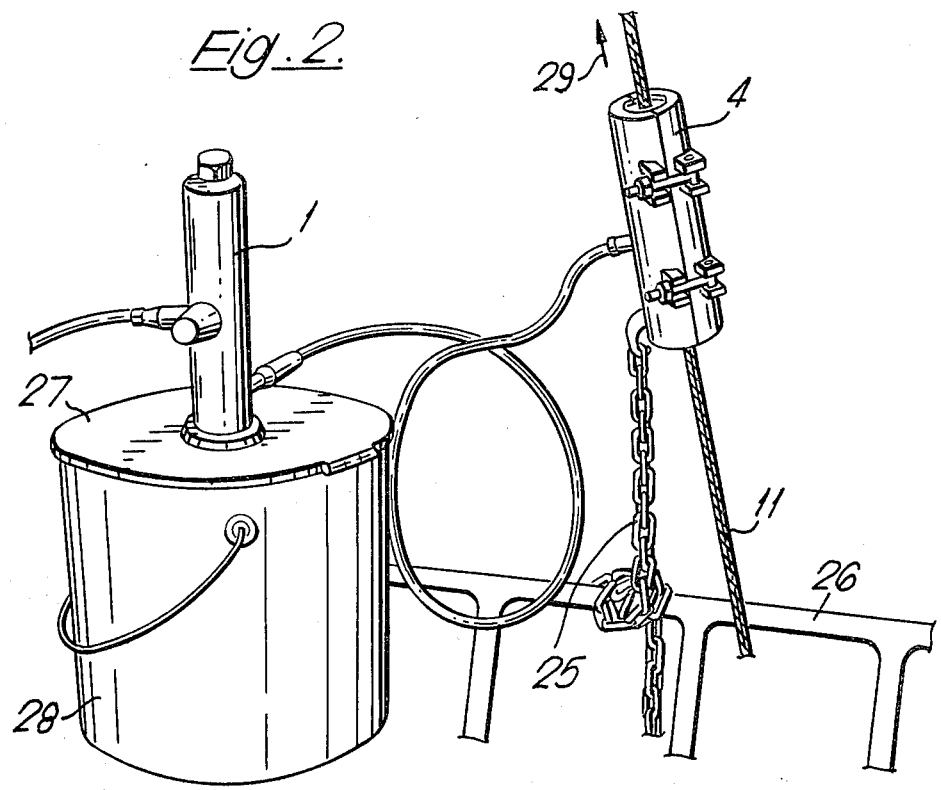
Figure 3:
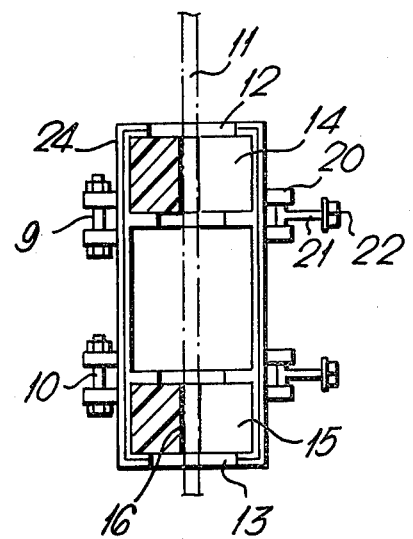

The invention will be elucidated in greater detail in the following with reference to the accompanying drawings, where FIG. 1 shows an embodiment of an apparatus according to the invention, FIG. 2 depicts the apparatus in use, and FIG. 3 shows a cross section through the lubricating chamber of the apparatus.

The apparatus consists of a suction pump 1 with a suction pipe 2, connected to a hose 3 on the pressure side which leads to a lubricating chamber 4. The pump 1, in the illustrated embodiment example, is a pressurized air-driven pump which is supplied with pressurized air at, for instance, 12 bar through a conduit 5 over a valve 6. The pump can deliver 40 times the supplied pressure, but has a smaller capacity.

The chamber 4 consists of two halves 7, 8 which are hinged together by means of hinges 9, 10 (FIG. 3) such that a cable 11 can be inserted into the chamber when the halves 7, 8 are in an open position. At each end of the chamber is an opening 12, 13 for the cable 11 which is to be lubricated. In connection with these openings there are provided tight-fitting rubber gaskets 14, 15 made of an oil-resistant rubber quality. The aperture 16 in the gaskets is dimensioned somewhat smaller than the diameter of the cable 11 which is to pass therethrough. The sleeves 14, 15 have a radial slit extending from the outer margin all the way in to the aperture 16. This slit is indicated in FIG. 3 in that the right-hand portion of each of the sleeves 14 and 15 is not shaded in the drawing.

After the cable 11 has been guided into the chamber by opening the two halves 7, 8 and inserting the cable through the slit in the rubber sleeves 14, 15, the sleeve halves are closed and clamped together by means of locking means 18, 19. The locking means consist of two lugs on each of the sleeve halves at the division between the sleeves. Attached to the lugs 20 on the sleeve half 8 is the cross-piece of a T-shaped bolt 21, which is threaded on the opposite stem end thereof. The bolt can be tightened against the lugs 23 on the other sleeve half 7 by means of a nut 22. Between the sleeve halves, a gasket 24 is provided.

A chain 25 is attached to the lubricating chamber 4; during use, the chain can be secured to a railing 26 or the like. When the apparatus is to be used, the chamber 4 is threaded onto the cable 11 and the chamber 4 is anchored to a railing or some other fixture by means of the chain 25. The pump 1 is passed down through a hole in a specially made lid 27 on a bucket of oil 28. The lid does not have to be particularly tight-fitting, as the oil is merely sucked up from the bucket. The pump is started and provides the chamber 4 with a small amount of oil at high pressure, and the cable 11 is drawn in the direction of the arrow 29. The rate of advance of the cable is regulated according to the pressure and capacity of the pump so that one avoids leakage.

A test apparatus of the type described hereinabove has been used experimentally on an oil installation in the North Sea, and tests have shown that the cables are thereby very effectively lubricated with no appreciable leakage to speak of. With the previously known lubricating devices, this work went slowly, and there was considerable spillage on deck. Previously, therefore, this operation was very costly, since ship regulations set very high standards for cleaning the decks. Any such clean-up work thus requires long time and effort, as the decks have to be scoured with a cleaning fluid and subsequently be scrubbed and rinsed off. A log was kept of the lubricating operation performed using the apparatus of the invention and in comparison with previous devices and methods, approximately U.S. $2,665 was thereby saved on lubrication of the cable on a single crane.

I claim:

1. A method of lubricating steel cables with the aid of a lubricating device including a lubricating chamber and a pair of opposed axially aligned resilient sleeve-shaped gaskets comprising the steps of supplying a liquid lubricant to said lubricant chamber from a pump at a high delivery pressure of at least 20 bar and drawing a steel cable through said lubricating chamber between said gaskets at a rate of passage selected to permit the lubricant to penetrate the cable and substantially fill the hollow spaces in the cable entering the chamber without buildup of pressure in the chamber materially above the delivery pressure thereby to avoid leakage of lubricant through said gaskets and around the cable.

2. The method as defined in claim 1 wherein said step of supplying liquid lubricant comprises the step of supplying the lubricant at a pressure of at least 40 bar.

3. The method as defined in claim 2 wherein said liquid lubricant is oil.

* * * * *